J. D. SCRIVNER.
ANT TRAP.
APPLICATION FILED MAR. 1, 1920.
1,424,596.
Patented Aug. 1, 1922.
2 SHEETS—SHEET 1.
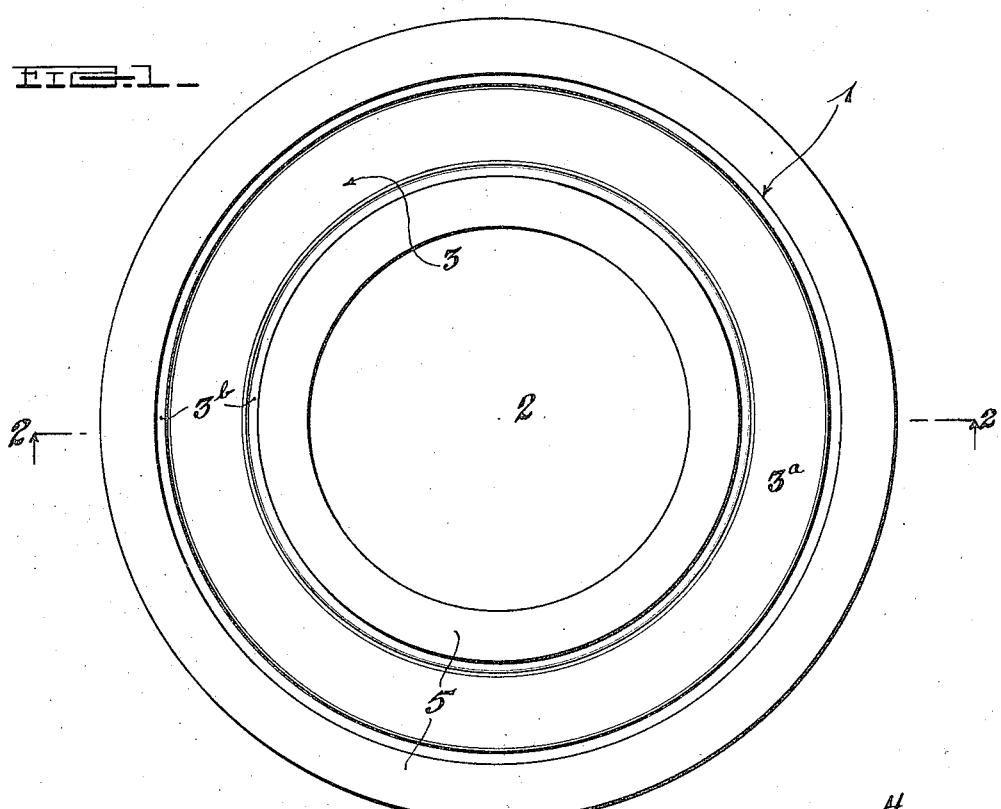
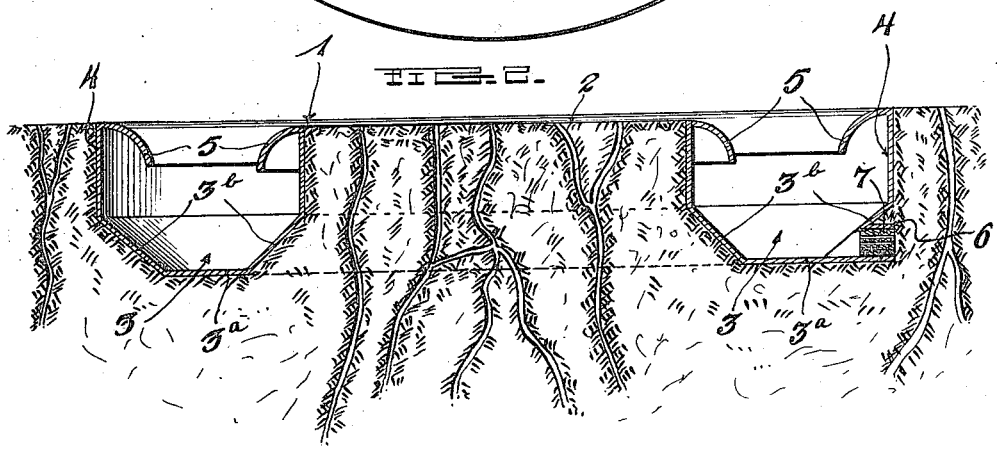
Inventor
J. D. Scrivner
Witness
By
Attorneys

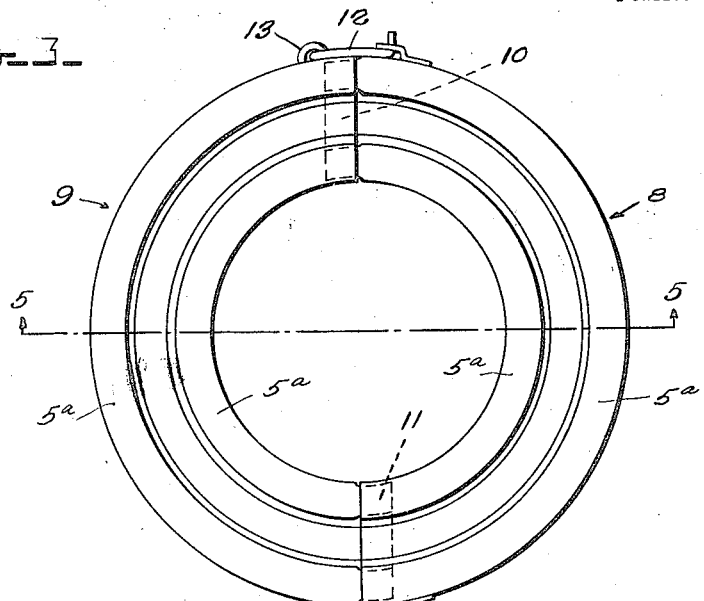
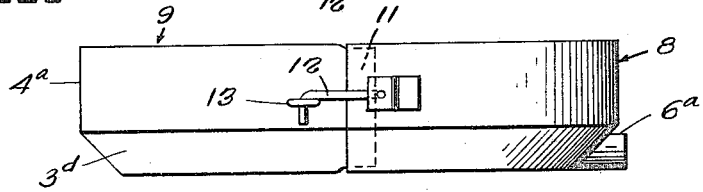
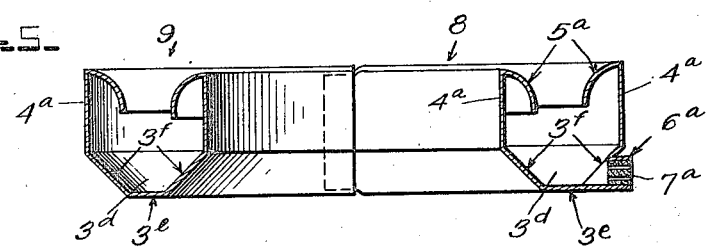
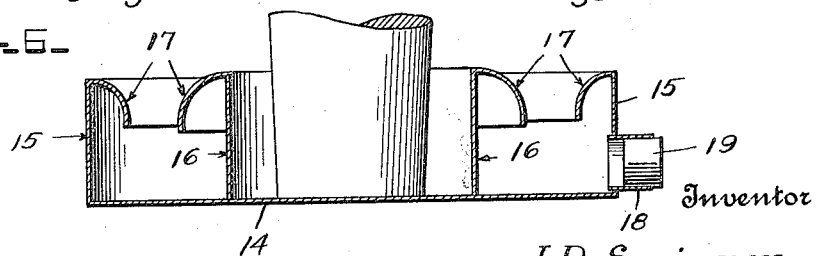

UNITED STATES PATENT OFFICE.

JEFFERSON DAVIS SCRIVNER, OF SAN BENITO, TEXAS.

ANT TRAP.

1,424,596.

Specification of Letters Patent.  Patented Aug. 1, 1922.

Application filed March 1, 1920. Serial No. 362,503.

*To all whom it may concern:*

Be it known that I, JEFFERSON DAVIS SCRIVNER, a citizen of the United States, residing at San Benito, in the county of Cameron and State of Texas, have invented certain new and useful Improvements in Ant Traps; and I do declare the following to be a full, clear, and exact description of the invention, such as will enable others skilled in the art to which it appertains to make and use the same.

This invention relates to improvements in insect traps and it has more particular reference to an ant trap.

It is well known that certain sections of this country are infested with great quantities of fruit and leaf eating ants, commonly known as "cutting ants", and it has long been desired by people annoyed by these pests, to find some effective method of destroying them. Powders and medicines are useless and the employment of powder and other insect destroying liquids has proven to be disastrous to the plants and fruit trees upon which these articles are spread.

It is therefore the primary object of this invention to provide a simple and effective means for entrapping such insects and destroying them, a method which overcomes, to a great extent, the disadvantages above mentioned:

Another object of the invention is to provide a trap for the above mentioned purpose which has means associated therewith for automatically draining the same of rain water, the drain being of such construction that it will prevent the escape of any insects through it.

A further object of the invention is to provide a trap of the above mentioned type which is of such construction that it may be used, by changing it slightly, as a house trap, a field trap, or a tree trap, that is, in the house it may be placed beneath furniture legs; in the field, it may be embedded in the ground; and when used as a tree trap, it may be secured around the trunk of a tree.

Other objects and advantages of the invention will become apparent during the course of the following description.

In the accompanying drawings forming a part of this specification and in which like numerals are employed to designate like parts throughout the same, Figure 1 is a top plan view of a trap constructed in accordance with my invention.

Figure 2 is a central sectional view thereof taken on the plane of the line 2—2 of Fig. 1.

Figure 3 is a top plan view of a modified form of the trap.

Figure 4 is an elevation of the trap shown in Fig. 3.

Figure 5 is a central section view thereof, taken on the line 5—5 of Fig. 3.

Figure 6 is a view like Fig. 5 disclosing another form of the invention.

In Figs. 1 and 2 of the drawing, wherein for the purpose of illustration is shown one embodiment of my invention, the numeral 1 indicates a circular trough which is provided with a central opening 2 therein adapted to be placed over the mouth of an ant hill, whereby the ants, coming out of, or going to, their holes will be trapped therein.

The trough includes a channel-shaped base 3, the bottom 3ª of which is substantially flat and horizontal, and the walls 3ᵇ of which are upwardly and outwardly inclined. Soldered or otherwise secured to the upper edges of the walls 3ᵇ of the base 3 are the ring-like members 4 which completes the trough. Hence, it will be seen that the trough constitutes inner and outer spaced walls rising upward from a base. When the ants get into the trough they cannot escape therefrom because of the inwardly and downwardly curved flanges 5 carried by the ring-like members 4. Of course, when the trough is in the ground, as shown, rain is very likely to fill it up, and I desire to prevent this as much as possible. To this end I provide a drain or outlet pipe 6 at the base 3 of the trough and I close this pipe by means of a plug 7 of any suitable porous material. It is therefore obvious that the water will automatically run out of the trough, but the ants or other insects will not escape through this passage. I desire particularly to emphasize this feature because a trap of this type would naturally become filled with water during the rainy weather, and if there were no means to permit the water to pass out, and yet retain the insects therein, it would be necessary to remove the trap from the ground before it could be emptied. It too, might otherwise overflow and the water would carry the ants with it, maybe not entirely destroying them. In the part of the country where this type of trap is to be used most, the ants are quite large and very disastrous to the life of plants and fruit trees, being commonly known as "cutting ants" and it is essential that they be entirely destroyed. A trap constructed in accordance with my invention will insure effective results. Another feature that I desire to call attention to, is the fact that the flanges 5 are inwardly and downwardly curved. This feature is advantageous in that ants coming up through the ground at the opening 2 of the trough will easily and more readily tumble over the downwardly curved flanges than if the latter were straight or flat. The flanges are to be narrow and abruptly curved downwardly so as to prevent the ants from getting back to a point of safety when once on this flange. This flange also serves to prevent the ants from climbing up the walls of the trough and escaping, as is obvious.

In using this form of trap, it is embedded in the ground over the mouth of an ant hill and ants either coming out of their holes or going to their holes will be trapped therein in the manner already set forth.

In Figs. 3 to 5 inclusive I have shown a slightly different form of trap. This trap is to be used as a tree trap, being of such construction that it may be placed around the trunk of a tree to catch the ants climbing either up or down. The trap disclosed in the aforesaid figures of the drawings is constructed in the same manner as the one already described. Briefly described, it comprises a channel-shaped base $3^d$, which in turn includes a flat horizontal bottom $3^e$ and upwardly and outwardly directed spaced walls $3^f$ which are permanently secured to the bottom. This form of the invention also includes the ring-like members $4^a$ which carries the inwardly and downwardly curved flanges $5^a$. An outlet pipe $6^a$ communicates with the base, serving as the drain. So far, the construction of this form of trap is identical with the form shown in Figs. 1 and 2. The difference between the two resides in the fact that this form of trap, instead of being made in the form of a unitary structure, is made so that it includes two semi-circular half-sections 8 and 9 and each section has one of its ends reduced in size, such as for example the section 8 has its end 10 reduced, while the other section has one of its ends reduced as shown at 11. This construction permits the ends of the two sections to be brought together in a telescopic manner, the reduced end 10 fitting into one end of the section 9, while the reduced end 11 of the latter fits into the non-reduced end of the section 8 in the manner shown. An effective joining of the sections is obtained by constructing the sections in this way and while water may escape at these joints during constant use of the device, there will be no escape of the ants from these points. Suitable means will be employed to hold the sections together. To this end I desire to provide the section 9 with pivoted hooks 12 and I provide the section 8 with eyes 13 with which the hooks may co-operate to hold the sections together. Escape of water from this trap will be permitted by the outlet $6^a$ which, like the outlet 6, will have a porous plug $7^a$ placed therein. As before stated, this type of trap is to be used to entrap insects therein which would otherwise climb up and down the trunk of a tree. It is obvious that when it is desired to make use of the same, it is only necessary to place the semi-circular sections 8 and 9 about the tree trunk, whereupon the hooks 12 may be brought to operative position to retain the trap in position.

In order to make use of my trap in a house, I contemplate changing the construction slightly. This change is clearly illustrated in Fig. 6, wherein I have shown the trap including a flat, circular, solid bottom 14 from the outer edge of which an endless wall 15 rises. A second wall 16 rises from the bottom at a point spaced from the first named wall and each of the walls carry inwardly and downwardly curved flanges 17. The outer wall 15 is provided with an outlet 18, which, when in use is usually closed by means of a plug 19 of suitable material. In the majority of cases this plug will necessarily have to be made of non-porous material, that is when the trap is used in the house. On the other hand, when it is used out of doors a plug of porous material will be used so as to permit the escape of surplus water, as in the manner already described. For instance, when the trap is used in the house, a quantity of exterminating liquid will be placed therein, and of course it is desired to prevent this from accidentally flowing out, so, in this instance a non-porous plug will be used, while when the trap is exposed to the rain a plug of porous material will be used to permit ready escape of the water without permitting the escape of the insects. It is obvious that this type of trap is adapted to receive the lower end of a table leg or the like so as to prevent insects from climbing up the legs as they usually do.

From the foregoing description taken in conjunction with the accompanying drawings, it is believed that the features and manner in which my traps are used is clear, therefore, further detailed description is deemed unnecessary.

I am well aware of the fact that similar devices have been patented, but I believe that none of such devices possess all the advantages of my trap.

Insect traps of the above construction are simple and effective, strong, durable and inexpensive to manufacture, and have been tried out and have proven to be successful.

It is to be understood that the forms of my invention herein shown and described are to be taken as preferred forms of the same, and that various minor changes in the shape, size, and arrangement of parts may be resorted to without departing from the spirit of the invention or the scope of the subjoined claim.

I claim:

An ant trap comprising an annular trough provided with spaced inner and outer vertical sides between which the ants are confined, said sides being provided at their upper edges with means to prevent the ants from climbing up the inner faces thereof and escaping, a drain pipe connected to the outer side of the trough adjacent the bottom thereof, and a porous plug arranged in said drain pipe for permitting water in the trough to continuously discharge therefrom without permitting escape of the ants.

In testimony whereof I have hereunto set my hand.

JEFFERSON DAVIS SCRIVNER.